US009559615B2

United States Patent
Kuo et al.

(10) Patent No.: US 9,559,615 B2
(45) Date of Patent: Jan. 31, 2017

(54) FULLY VARIABLE POWER SUPPLY CONTROLLER

(71) Applicants: Michael Kuo, Las Vegas, NV (US); Tao Zhu, Las Vegas, NV (US)

(72) Inventors: Michael Kuo, Las Vegas, NV (US); Tao Zhu, Las Vegas, NV (US)

(73) Assignee: Magtech Industries Corporation, Las Vegas, NV (US)

( * ) Notice: Subject to any disclaimer, the term of this patent is extended or adjusted under 35 U.S.C. 154(b) by 135 days.

(21) Appl. No.: 14/696,356

(22) Filed: Apr. 24, 2015

(65) Prior Publication Data

US 2015/0349657 A1 Dec. 3, 2015

Related U.S. Application Data

(60) Provisional application No. 62/006,874, filed on Jun. 2, 2014.

(51) Int. Cl.
*H02M 7/538* (2007.01)
*H02M 7/5387* (2007.01)
*H02M 7/219* (2006.01)
*H02M 1/00* (2006.01)

(52) U.S. Cl.
CPC ......... *H02M 7/53873* (2013.01); *H02M 7/219* (2013.01); *H02M 2001/0012* (2013.01)

(58) Field of Classification Search
CPC .. H02M 7/04; H02M 7/219; H02M 2001/007; H02M 2001/0012
See application file for complete search history.

(56) References Cited

U.S. PATENT DOCUMENTS

| 3,745,366 A * | 7/1973 | Simon | B60L 11/06 105/61 |
| 2003/0090237 A1* | 5/2003 | Shenai | H02J 7/0052 320/139 |
| 2004/0051510 A1* | 3/2004 | Saggini | H02M 3/157 323/282 |
| 2005/0007794 A1* | 1/2005 | Fukumoto | H02M 1/36 363/16 |
| 2005/0219865 A1* | 10/2005 | Vogman | H02M 3/33569 363/16 |
| 2005/0289373 A1* | 12/2005 | Chapuis | G06F 1/26 713/300 |
| 2006/0062028 A1* | 3/2006 | Powers | H02M 3/33507 363/21.17 |
| 2008/0001553 A1* | 1/2008 | Qiu | H02M 3/1588 315/307 |
| 2008/0052551 A1* | 2/2008 | Chapuis | G06F 1/26 713/340 |

(Continued)

*Primary Examiner* — Timothy J Dole
*Assistant Examiner* — Yusef Ahmed
(74) *Attorney, Agent, or Firm* — Lightbulb IP, LLC (57) ABSTRACT

A fully variable controller allows wide range of output voltages and output currents to be programmed therein. In this manner, a power supply including the fully variable controller can power a wide range of electrical loads having distinct voltage and current requirements. The fully variable controller includes a control unit, a voltage regulator and a current regulator configured, respectively, to provide and maintain voltage and current according to an output voltage and output current programmed into the fully variable controller.

20 Claims, 4 Drawing Sheets

(56) References Cited

U.S. PATENT DOCUMENTS

| | | | |
|---|---|---|---|
| 2008/0316779 A1* | 12/2008 | Jayaraman | H02M 1/4225 363/74 |
| 2009/0230930 A1* | 9/2009 | Jain | H02M 3/1588 323/234 |
| 2010/0052647 A1* | 3/2010 | Forghani-zadeh | H03K 17/122 323/349 |
| 2011/0249473 A1* | 10/2011 | Li | H02M 3/33515 363/21.02 |
| 2013/0027993 A1* | 1/2013 | Tan | H02M 7/515 363/40 |
| 2013/0221905 A1* | 8/2013 | Holloway | H02J 7/0054 320/107 |
| 2013/0223108 A1* | 8/2013 | Xu | H02M 3/33507 363/21.17 |
| 2013/0250629 A1* | 9/2013 | Xu | H02M 3/33523 363/21.17 |
| 2013/0320942 A1* | 12/2013 | Vemula | G05F 1/573 323/274 |
| 2014/0192566 A1* | 7/2014 | Yang | H02M 3/33523 363/21.15 |
| 2015/0311696 A1* | 10/2015 | Zhu | H02H 7/06 361/21 |
| 2016/0049206 A1* | 2/2016 | Huynh | G11C 16/30 365/185.21 |
| 2016/0079888 A1* | 3/2016 | Li | H02P 6/002 318/400.3 |
| 2016/0147239 A1* | 5/2016 | Yan | G05F 1/575 323/280 |
| 2016/0172855 A1* | 6/2016 | Cardillo | G05F 1/66 700/298 |
| 2016/0173012 A1* | 6/2016 | Nondahl | H02P 6/08 318/400.34 |
| 2016/0234894 A1* | 8/2016 | Wang | H05B 33/0815 |

* cited by examiner

FIG. 5 derscribe # FULLY VARIABLE POWER SUPPLY CONTROLLER

CROSS-REFERENCE TO RELATED APPLICATION

This application is claims priority to U.S. Provisional Patent Application No. 62/006,874, filed Jun. 2, 2014.

BACKGROUND OF THE INVENTION

Field of the Invention

The invention relates to power supplies and in particular to a fully variable power supply controller that provides variable voltage and current output.

Related Art

Power supplies are widely used to power various electronic devices. For example, one application for a power supply is to convert power from AC to DC or vice versa. Another application is to accept input power and provide output power at a desired level to operate a particular electronic device. For example, a power supply may be used to convert power from a wall outlet to a lower voltage, current or both.

Traditional power supplies are configured to provide a preset voltage that matches the input voltage of an electronic device. The preset voltage may be maintained by attempting to hold voltage constant by dropping less input voltage or drawing additional input current when the output voltage is too low and by dropping more input voltage when the output voltage is too high.

From the discussion that follows, it will become apparent that the present invention addresses the deficiencies associated with the prior art while providing numerous additional advantages and benefits not contemplated or possible with prior art constructions.

SUMMARY OF THE INVENTION

A fully variable controller is disclosed herein. The fully variable controller allows a power supply to provide different voltage and current output. This allows the same power supply to be used to power a variety of electrical loads. The fully variable controller increases efficiency versus traditional power supply controllers in that the voltage and current adjustment allows voltage as well as current to be increased or decreased based on the electrical load to be powered.

The fully variable controller may be implemented in various systems and methods, as disclosed further below. In one exemplary embodiment, a fully variable controller for a power supply is disclosed, with such controller comprising a control unit comprising one or more programming interfaces for receiving a voltage output value and an current output value. The control unit generates a voltage level based on voltage feedback and the voltage output value, and a current level based on current feedback and the current output value.

This fully variable controller also comprises an output configured to transmit signals to a power converter, a voltage regulator, and a current regulator. The voltage regulator receives the voltage level from the control unit and to compare the voltage level to a voltage reference value. A first output is generated by the voltage regulator based on the comparison of the voltage level to the voltage reference value. The current regulator receives a current level from the control unit and to compare the current level to a current reference value. A second output is generated by the current regulator based on the comparison of the current level to the current reference value. The first output and the second output respectively define a voltage output and a current output of the power converter.

The fully variable controller may also include a memory device that stores the voltage output value and the current output value. Also, a voltage limiter and a current limiter may be provided. In such case, the voltage level may be limited by the voltage limiter while the current level may be limited by the current limiter.

The programming interfaces may comprise an electrical data communication port. In addition or alternatively, the programming interfaces may comprise one or more wireless communication interfaces. A voltage sensor may be included to receive the voltage feedback. Similarly, a current sensor may be included to receive the current feedback.

In another exemplary embodiment, a controller is disclosed, with such controller comprising a control unit comprising one or more interfaces for receiving programming comprising one or more voltage values and one or more current values from an external device, one or more memory devices that store the programming, a voltage reference that outputs a reference voltage, and a current reference that outputs a reference current. The control unit generates a voltage level based on the voltage values and voltage feedback, and generates a current level based on the current values and current feedback.

The controller also comprises one or more voltage regulators that compare the voltage level to the reference voltage and generate a voltage output signal based on this comparison, one or more current regulators that compare the current level to the reference current and generate a current output signal based on this comparison, and one or more outputs configured to transmit the voltage output signal and the current output signal to a power converter of a power supply.

One or more voltage sensors that receive the voltage feedback, one or more current sensors that receive the current feedback, or both may be included as well. The interfaces may be wireless interfaces. Alternatively or in addition, the interfaces may comprise a electrical data port. A voltage limiter and a current limiter may also be provided. In such case, the voltage level is limited by the voltage limiter and the current level is limited by the current limiter.

Various methods are also disclosed herein. For instance, in one exemplary embodiment, a controller implemented method for controlling output at a power supply is disclosed, with such method comprising receiving programming comprising a voltage output value and a current output value at a control unit, detecting a voltage level with a voltage sensor and a current level with a current sensor, comparing the voltage level to a reference voltage with a voltage comparator and generating a voltage output signal based on this comparison, and comparing the current level to a reference current with a current comparator, and generating a current output signal based on this comparison. The method also includes transmitting the voltage output signal and the current output signal to a power converter. The voltage and current output of the power converter are respectively defined by the voltage output signal and the current output signal.

The reference voltage may be generated with a voltage reference. Likewise, the reference current may be generated with a current reference. The programming may be stored in one or more memory devices. The programming may be received wirelessly by the control unit. In addition, the current level may be limited to a predefined maximum level by a current limiter. Similarly, the voltage level may be limited to a predefined maximum level by a voltage limiter.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The fully variable controller, and power supplies including the fully variable controller disclosed herein are configured to provide both variable voltage and current. This is beneficial in that a wide variety of electrical loads can be powered by the same power supply, including electrical loads that differ in both input voltage and current requirements or specifications.

As will be described herein, the fully variable controller also has the advantage of utilizing multiple input or feedback types during operation to maintain a desired voltage and current. A steady state voltage and current can therefore be both selected and maintained for a particular electrical load.

It is noted that the "electrical load" referenced herein may be a variety of electronic devices to be powered by via fully variable controller. Typically, but not always, an electrical load will be a DC device. Some exemplary DC electrical loads include LED lighting, motors, and batteries (such as rechargeable batteries to be charged).

Figure 1:
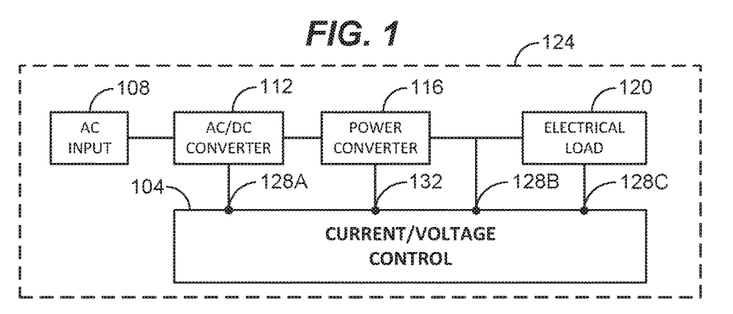
FIG. 1 is a block diagram illustrating an exemplary fully variable controller in an exemplary environment of use.

FIG. 1 is a block diagram illustrating an exemplary fully variable controller 104 in an exemplary environment of use. Namely, the fully variable controller 104 is part of an exemplary power supply 124 that receives AC power at an AC input 108 and converts such power to DC via an AC/DC converter 112 to provide DC power to an electrical load 120. A power converter 116 may be used to maintain a selected voltage and current based on input it receives from the fully variable controller 104. It is contemplated that an electrical load 120 may have an integrated power supply 124 having the fully variable controller 104. Alternatively, an electrical load 120 may be powered by an external or remote power supply 124 having the fully variable controller 104.

As shown by the arrows of FIG. 1, the fully variable controller 104 may have one or more inputs 128 connected to an AC/DC converter 112, power converter 116, electrical load 120 or various combinations/subsets thereof. In addition, the fully variable controller 104 may have one or more outputs 132 connected to a power converter 116. In general, the one or more inputs 128 are configured to receive power and feedback signals, while the one or more outputs 132 are configured to transmit output such as control signals.

With regard to the embodiment of FIG. 1, a first input 128A may be configured to receive DC power from a AC/DC converter 112, while one or more second inputs 128B, 128C receive feedback such as from a power converter 116, electrical load 120 or both. In one or more embodiments, the feedback may comprise indicators of or signals identifying voltage and current levels or actual voltage and current. Control signals may be transmitted via one or more outputs, such as to control or otherwise operate the power converter 116 to maintain a selected voltage and current output for the electrical load 120. Typically, the control signals will be generated and adjusted by the fully variable controller 104 based on the feedback received at the fully variable controller's inputs 124.

For example, feedback indicative of a low voltage and current condition would result in a control signal to increase voltage and current, such as via a power converter 116. The following Table 1 shows some exemplary control signals corresponding to particular feedback received by the fully variable controller 104. If the feedback indicates voltage or current matching the selected or desired current for an electrical load 120, no control signal may be generated/transmitted or a control signal indicating no change to voltage or current should be made may be generated and transmitted.

TABLE 1

| FEEDBACK | CONTROL SIGNAL |
| --- | --- |
| Low Voltage and Low Current | Increase Voltage and Current |
| Low Voltage and High Current | Increase Voltage and Decrease Current |
| High Voltage and Low Current | Lower Voltage and Increase Current |
| High Voltage and High Current | Lower Voltage and Current |

In one or more embodiments, a fully variable controller 104 may comprise a microcontroller, microprocessor, FPGA, electrical circuit or various combinations thereof configured to function as disclosed herein. It is contemplated that a fully variable controller 104 may also including a memory device for storing instructions that control its operation. Alternatively, such instructions may be hardwired into a microcontroller, microprocessor or the like of a fully variable controller 104. Additional details regarding the operation of a fully variable controller 104 are disclosed further below.

Figure 2:
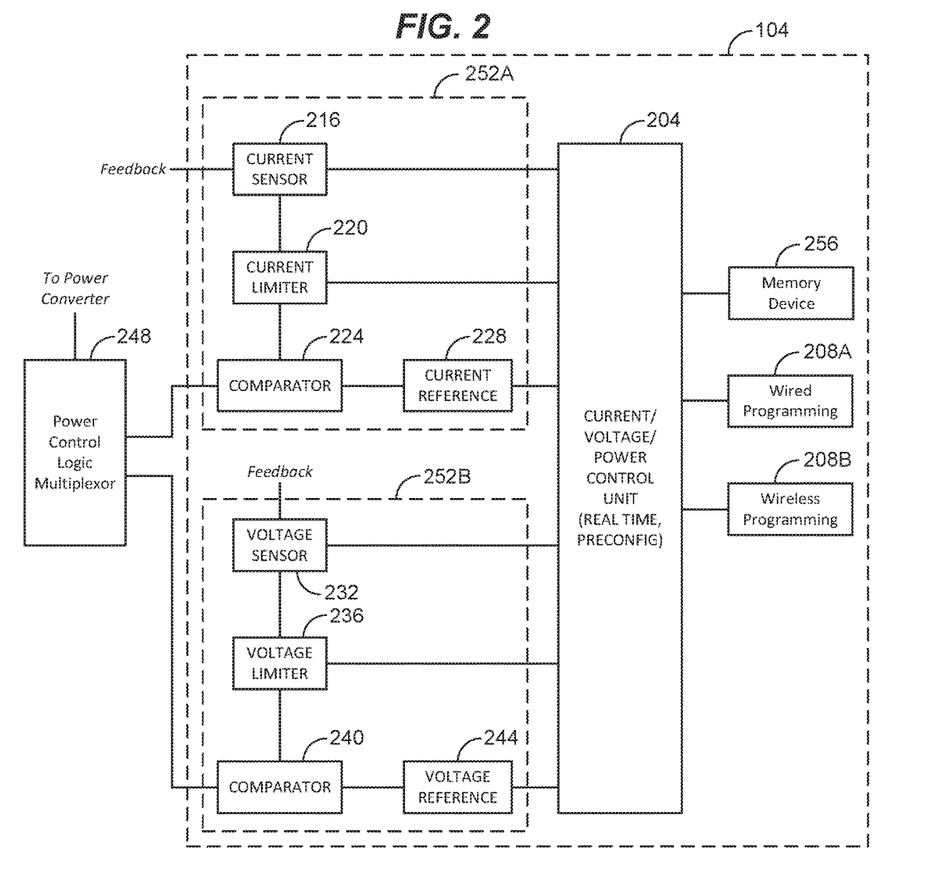
FIG. 2 is a block diagram illustrating an exemplary fully variable controller in an exemplary environment of use.

FIG. 2 is a block diagram illustrating components of an exemplary fully variable controller 104 in an exemplary environment of use. As can be seen the fully variable controller 104 may comprise a control unit 204 and one or more regulators 252. Each regulator may be configured to regulate a different characteristic of the output of a power supply. For instance, in the embodiment of FIG. 2, the fully variable controller 104 comprises a control unit 204, a current regulator 252A and a voltage regulator 252B. As can be seen, a regulator 252 may be implemented in an electronic circuit separate from the control unit 204. It is contemplated that a regulator 252 may also be integrated into the control unit 204 itself in one or more embodiments.

As shown by the arrows of FIG. 2, a regulator 252 may receive input from a control unit 204 at an input terminal and provide output, such as to a power converter. This output is used to control operation of the power converter, namely, to adjust current and voltage as needed, as will be discussed further below. An optional multiplexor 248 may be provided to facilitate communication from multiple regulators 252 to a single power converter. Alternatively, it is contemplated that each regulator 252 may be directly connected to a power converter.

As implied by its name, a regulator 252 is typically configured to regulate a particular characteristic of a voltage or current (or other signal), so that such characteristic stays within a predefined range or at a predefined value. A regulator 252 may also include a sensing function to help determine how regulation of a characteristic should occur.

With reference to the current regulator 252A of FIG. 2, the regulation function may be implemented using a current reference 228 and a comparator 224, with the comparator receiving input from the current reference and the control unit 204 via an input terminal. The current reference 228 is configured to provide a predefined reference current to the comparator 240. A current limiter 220 will typically be included as well to limit current to a particular maximum to prevent damage to the current regulator 252A and other components that may be caused by excessive current.

The sensing function of a current regulator 252A may be implemented with a current sensor 216 that receives input via an input terminal from which the current sensor can determine a current level. For instance, the input may be feedback or a feedback signal received from another component of the power supply, such as a current.

In operation, the current sensor 216 may determine a current level from the input it receives. This information may then be transmitted to the control unit 204, which generates an output based on the same. This output will indicate a current level and may pass through the current limiter 220 on its way to the comparator 224 for comparison with the reference current provided by the current reference 228. The result of the comparison may then be transmitted to a power converter, such as via the multiplexor 248 shown in the embodiment of FIG. 2. The power converter can then adjust its operation, namely its current output, based on the comparison.

As stated above, a voltage regulator 252B may also include a regulating function, sensing function or both. As shown in FIG. 2 for example, a voltage regulator 252B a voltage reference 244 that provides a reference voltage to a comparator 240 of the voltage regulator 252A may implement the regulating function. A voltage limiter 236 will typically also be included to limit voltage to a particular maximum to prevent damage to the voltage regulator 252B and other components that may be caused by excessive voltage. The sensing function of a voltage regulator 252B may be implemented via a voltage sensor that receives input via an input terminal from which the voltage sensor can determine a voltage level. The input may be feedback or a feedback signal received from another component of the power supply, such as a voltage.

In operation, output indicating a voltage level from the voltage sensor 232 may be transmitted to the control unit 204. In response, the control unit 204 may generate an output indicating a voltage level for use in a comparison with the voltage reference 244 at the voltage regulator's comparator 240. It is noted that the output may first pass through a voltage limiter 236 as described above. The result of the comparison may be transmitted from the comparator 240 to a power converter, such as via the multiplexor 248 shown in the embodiment of FIG. 2. The power converter can then adjust its operation, namely its voltage output, based on the comparison.

A regulator 252 and a control unit 204 may be connected in various ways. As shown in FIG. 2 for example, connections between the control unit 204 and the current regulator 252A and voltage regulator 252B allow transmission of signaling, power or both therebetween. Though shown with a plurality of connections between the control unit 204 and regulators 252A, 252B it will be understood that one or more connections may be used in the various embodiments of the fully variable controller 104.

In addition, a control unit 204 may have a connection to individual elements of a regulator 252, such as to control such elements or to share signaling/information therewith. As shown for example, the control unit 204 has connections to the current reference 228, current limiter 220 and current sensor 216. With regard to the voltage regulator 252B, the control unit 204 has connections to the voltage reference 244, voltage limiter 236 and voltage sensor 232.

It is contemplated that fewer or additional connections may be used. For example, a connection between a control unit 204 and a voltage limiter 236 (or a control unit and a voltage reference 244) may be used to send and/or receive feedback, control signals or other information between the control unit and a voltage regulator 252B. Likewise, a connection between a control unit 204 and current limiter 220 (or a control unit and a current reference 228) may be used similarly. It is noted that receipt of such information at a control unit 204 may occur by detecting or otherwise determining changes in operating characteristics of a regulator 252 or component thereof.

As stated above, a control unit 204 receives input from its associated regulators 252. A resulting output is generated to define operation of the regulators 252. More specifically, the resulting output is used in a comparison, which determines if and how operation of a power converter should be adjusted. This output of the control unit 204 is generated based on the configuration of the control unit, which may be setup, changed or both via a programming interface. As shown in FIG. 2 for example, the control unit 204 comprises a wired programming interface 208A and a wireless programming interface 208B.

As their names imply, the programming interfaces 208 may provide both wired and wireless programming of the control unit 204. It is contemplated that various communication protocols may be utilized in programming the control unit. In addition, a wired programming interface 208A will typically comprise a communications port or the like to establish/connect to one more wired communication lines or links. Likewise, a wireless programming interface 208B will typically comprise a radio or the like configured to wirelessly establish/connect to one or more communication links.

In one or more embodiments, programming of a control unit 204 may comprise defining an output voltage and output current for the control unit. For example, the output voltage and output current may be set according to specification of an electrical load so that the fully variable controller 104 can properly power the electrical load. As can be seen, the fully variable controller 104 is "fully variable" in the sense that both its output voltage and output current can be defined via a programming interface 208. This is advantageous in that it permits a single fully variable controller 104 to be used to power a wide variety of electrical loads having different voltage and current requirements. A memory or storage device accessible to or integrated in the control unit 204 may store the programming. It is contemplated that an external and/or removable memory device 256 may be read by the control unit 204 to obtain its programming as well.

It is contemplated that a GUI or other user interface may be provided to program a control unit 204. In some embodiments, the control unit 204 may be configured to provide a user interface once a terminal or other client device is connected to the control unit via a programming interface. The user interface will typically include fields to receive values for output voltage and output current.

A control unit 204 may also store or have embedded therein executable instructions that provide automated functionality that allow it to determine an output voltage and output current automatically such as via one or more voltage or current sensors. In such embodiments, a programming interface need not be provided. If provided, a programming interface may be used to program the control unit to utilize or activate its automated mode, or to deactivate its automated mode for manual entry of an output voltage and output current.

As indicated above, a fully variable controller 104 may utilize a plurality of regulators 252 to compensate for fluctuations in voltage and current during operation. Typically, the regulators 252 and control unit 204 will seek to provide a voltage and current as defined in the control unit's programming (i.e., according to the programmed output voltage and output current). It is contemplated that a control unit's programming may also provide for adjustments to current relative to the defined output current based on current load, voltage load or both as sensed by one or more regulators 252. For example, if an electrical load decreases during operation, the current may be decreased from the value defined by the output current and increased if the electrical load increases.

Figure 3:
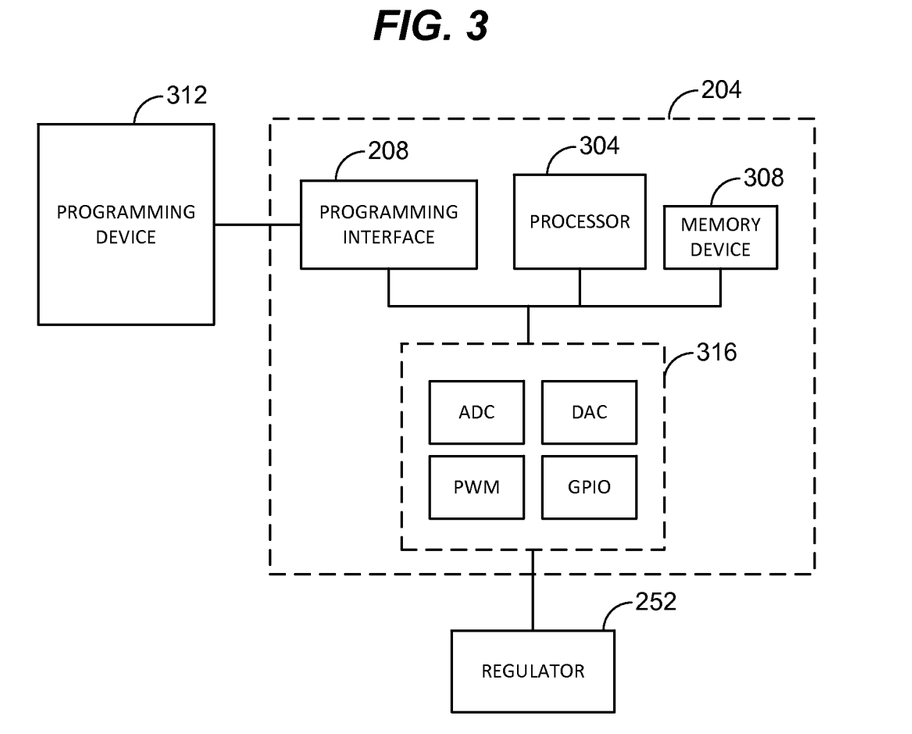
FIG. 3 is a block diagram illustrating an exemplary control unit.

FIG. 3 is a block diagram illustrating an exemplary control unit 204 and components thereof. As can be seen, a control unit 204 may comprise one or more processors 304, programming interfaces 208, and one or more memory devices 308. A processor 304 may be a microprocessor, microcontroller, or other circuitry arranged to operate a control unit 204 as disclosed herein. Additional details regarding such operation are disclosed further below.

A memory device 308 may be used to store various data. For example, one or more current limit, voltage limit, current reference, voltage reference or other current or voltage values may be stored in a memory device 308. A memory device 308 may also store machine readable code comprising one or more instructions executable by a processor 304. Such instructions will typically govern the operation of the processor 304 and control unit 204. It is noted that the instructions may be embedded or integrated into the processor 304 itself in some embodiments. In addition, a memory device 308 may be a separate component, such as illustrated, or be integrated into a processor 304. It is contemplated that various technologies may be used to store data in a storage device 308. Some examples include flash memory, magnetic/optical storage, ROM, RAM, and EPROM technologies.

One or more communication devices 316 will typically be included in a control unit 204 as well. A communication device 316 may be unidirectional (i.e., transmit or receive only) or by bidirectional (i.e., both transmit and receive). Various communication methodologies and protocols may be used. As shown for example, a communication device 316 may comprise one or more of an analog to digital converter (ADC), digital to analog converter (DAC), pulse width modulator (PWM), or general purpose IO (GPIO) components to communicate with corresponding signaling.

A communication device 316 may be connected to one or more regulators 252 to transmit and or receive signals therefrom. Such signals may carry information that controls or configures a regulator 252, such as described above with regard to FIG. 2.

One or more programming interfaces 208 may be part of a control unit 204. As described above, a programming interface 208 may receive various configuration values, such as output current or output voltage. As disclosed above, programming may occur via a wired or wireless communication link. Some exemplary programming interfaces 208 include wired communication ports (e.g., USB, serial port, parallel port, etc. . . . ) or wireless interfaces (e.g., WiFi, Bluetooth, etc. . . . ). A programming interface 208 may be integral to a control unit 204, such as shown in FIG. 3, or a separate component, such as shown in FIG. 2.

Figure 4:
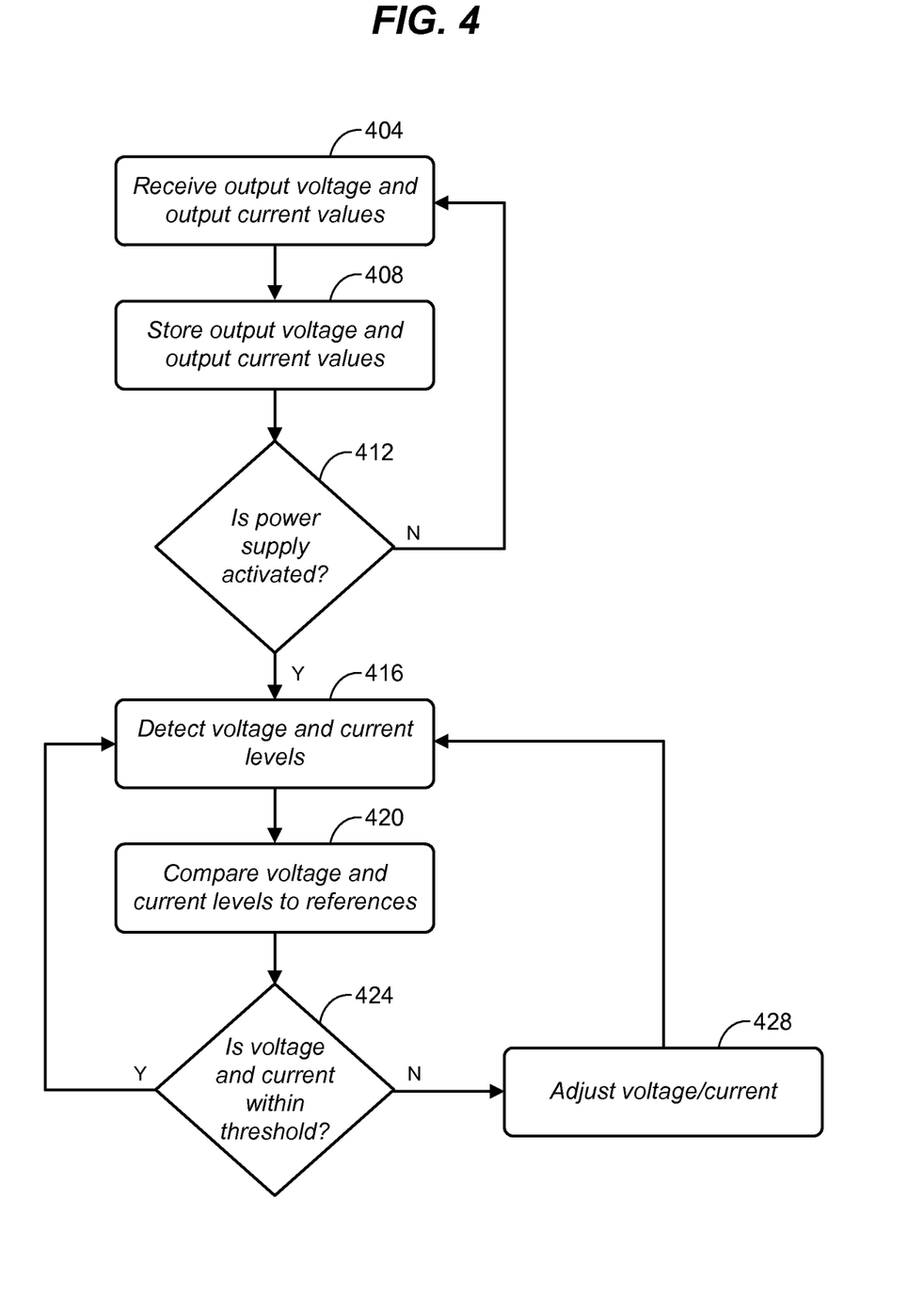
FIG. 4 is a flow diagram illustrating operation of an exemplary fully variable controller.

FIG. 4 is a flow diagram illustrating operation of an exemplary fully variable controller in a power supply. It will be understood that various of the steps disclosed below may be performed in a different sequence than that shown and described with regard to FIG. 4.

At a step 404, an output voltage and output current is received by a fully variable controller, such as via a programming interface. As described above, the output voltage and output current may be based on or defined by the specifications of an electrical load to be powered by the power supply containing the fully variable controller. A user, programmer or other operator may program the output voltage and output current into the fully variable controller. At a step 408, the output voltage and output current may be stored, such as on a memory device or the like. The stored output voltage and output current may then be referenced later during operation of the fully variable controller.

At a decision step 412 if the power supply is activated to power the electrical load a voltage and current level may be determined or received by the fully variable controller. As discussed above, this may occur by sensing the voltage and current respectively via a voltage sensor and current sensor. The sensed voltage and current may then be compared respectively to a voltage and current reference at a step 420. At a decision step 424, if the voltage and current are, respectively, different from or beyond a predefined range of the output voltage and output current, either or both the voltage and current may be adjusted at a step 428, such as via a power converter. This adjustment process may occur continuously while the power supply is activated. As shown in FIG. 4 for example, the process returns to the current and voltage detection step 416 after step 428 to allow for continuing adjustments to voltage and current. It is noted that steps 416 through 428 may occur simultaneously or separately for both voltage and current. If occurring separately, then the voltage and current may be adjusted at different times.

It is noted that if the power supply is not activated or is deactivated, such as at decision step 412, it may be reprogrammed such as by receiving new values for the output voltage and output current as described with regard to step 404. This permits the same fully variable controller (and associated power supply) to be used for a variety of electrical loads simply by changing its programming. In some embodiments, it is contemplated that the output voltage and current may be programmed while the power supply is activated.

Figure 5:
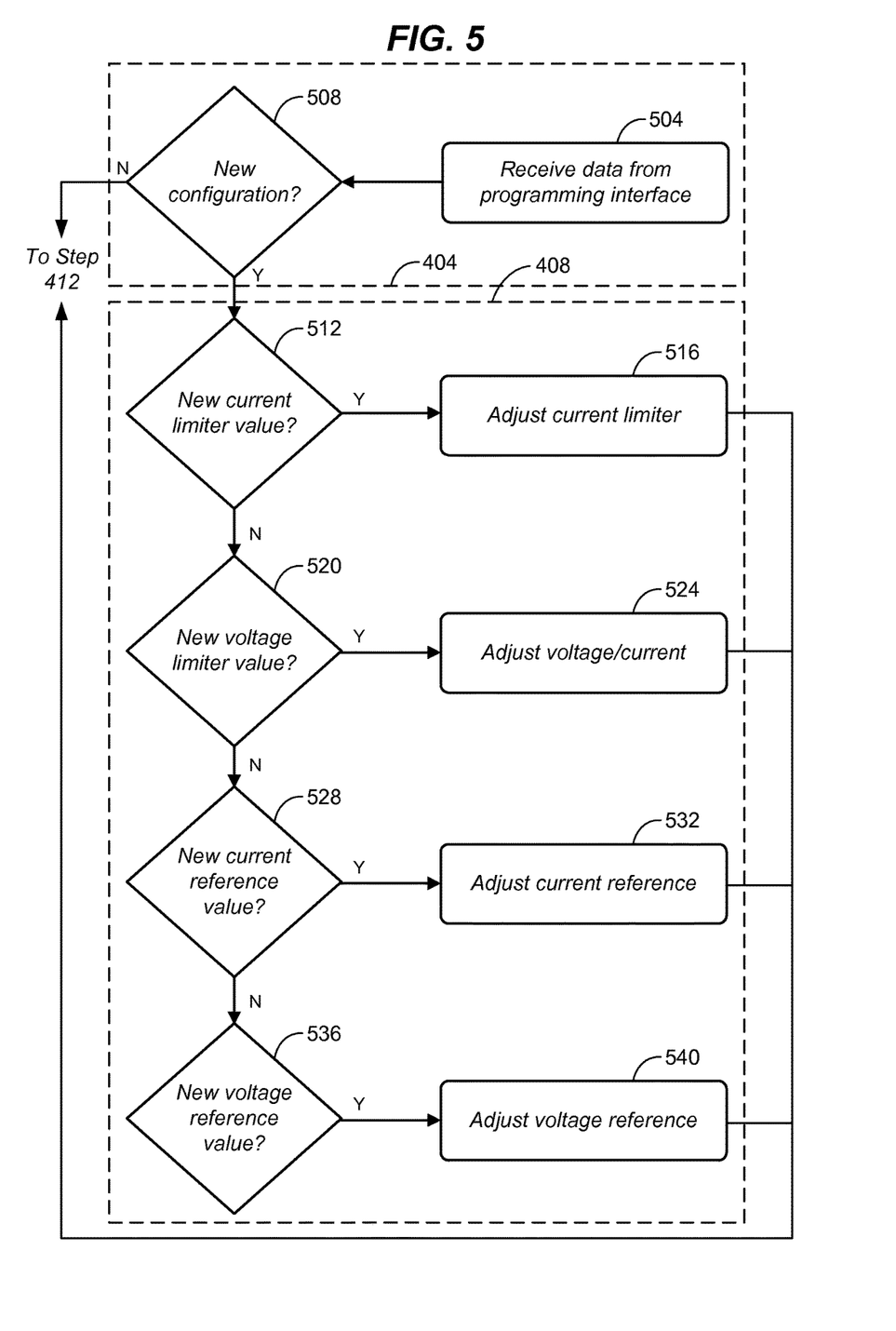
FIG. 5 is a flow diagram illustrating programming of an exemplary fully variable controller.

FIG. 5 is a flow diagram illustrating configuration of an exemplary fully variable controller. At a step 504 data may be received by a programming interface. At a decision step 508, it may be determined whether such data comprises new configuration settings. If not, operation may continue at step 412 of FIG. 4 (where the activated state of a power supply is evaluated). If new configuration settings are present, components of voltage or current regulators may be adjusted accordingly as will now be described.

At a decision step 512, if a new current limiter value is present in the configuration settings, a current limiter may be adjusted according to such value at a step 516. In operation, this may occur by transmitting signaling to adjust a current limiter of a current regulator from a control unit to the current regulator, such as via the control unit's communication device.

At a decision step 520, if a new voltage limiter value is present in the configuration settings, a voltage limiter may be adjusted accordingly at a step 524. Similar to above, this may occur by transmitting signaling to the voltage limiter. Likewise, at a decision step 528, if a new current reference value is present in the configuration settings, a current reference may be adjusted accordingly at a step 532. At a decision step 536, if a new voltage reference value is present in the configuration settings, a voltage reference may be adjusted accordingly at a step 540. As described above, such adjustment may occur by signaling transmitted to the desired component by the control unit. It is noted that the adjustments to voltage and current references as well as voltage and current limiters will typically set these components to the values provided in the configuration settings.

In one or more embodiments, various data may be received at a programming interface. For example, a status request (as opposed to configuration settings) may be received. In response a control unit may transmit operating characteristics of one or more components, such as for example current voltage or current values, or both. In these embodiments, a control unit, such as via its processor(s) may be arranged to determine the type of data it is receiving so as to discern between configuration settings and other received data. This may occur in various ways. In one exemplary embodiment, a particular indicator, such as a data type indicator or header data, may be used to detect configuration settings. As another example, configuration settings may have a unique predefined data structure that may be detected by a control unit.

In one or more embodiments, operation as disclosed with regard to FIGS. 3-4 may be defined in instructions stored on a non-transitory storage medium (such as the storage device disclosed above) and executable by a control unit of the fully variable controller. In this manner, a processor of a control unit may execute one or more instructions to provide the functionality disclosed above.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A fully variable controller for a power supply comprising:

a control unit comprising one or more programming interfaces for receiving a voltage output value and a current output value from an external device, wherein the control unit generates a voltage level based on voltage feedback from a power converter and the voltage output value, and a current level based on current feedback from the power converter and the current output value;

an output configured to transmit signals to the power converter;

a voltage regulator that receives the voltage level from the control unit and compares the voltage level to a voltage reference value, wherein a first output is generated by the voltage regulator based on the comparison of the voltage level to the voltage reference value; and a current regulator that receives a current level from the control unit and compares the current level to a current reference value, wherein a second output is generated by the current regulator based on the comparison of the current level to the current reference value;

wherein the first output and the second output respectively define a voltage output and a current output of the power converter.

2. The fully variable controller of claim 1 further comprising a memory device that stores the voltage output value and the current output value.

3. The fully variable controller of claim 1 further comprising a voltage limiter and a current limiter, wherein the voltage level is limited by the voltage limiter and the current level is limited by the current limiter.

4. The fully variable controller of claim 1, wherein the one or more programming interfaces comprise an electrical data communication port.

5. The fully variable controller of claim 1, wherein the one or more programming interfaces comprise one or more wireless communication interfaces.

6. The fully variable controller of claim 1 further comprising a voltage sensor, wherein the voltage feedback is received via the voltage sensor.

7. The fully variable controller of claim 1 further comprising a current sensor, wherein the current feedback is received via the current sensor.

8. A controller comprising:

a control unit comprising one or more interfaces for receiving programming comprising one or more voltage values and one or more current values from an external device, wherein the control unit generates a voltage level based on the one or more voltage values and voltage feedback from a power converter, and generates a current level based on the one or more current values and current feedback from the power converter;

one or more memory devices that store the programming;

a voltage reference that outputs a reference voltage;

a current reference that outputs a reference current;

one or more voltage regulators that compare the voltage level to the reference voltage and generate a voltage output signal based on this comparison;

one or more current regulators that compare the current level to the reference current and generate a current output signal based on this comparison; and one or more outputs configured to transmit the voltage output signal and the current output signal to the power converter of a power supply.

9. The controller of claim 8 further comprising one or more voltage sensors that receive the voltage feedback.

10. The controller of claim 8 further comprising one or more current sensors that receive the current feedback.

11. The controller of claim 8, wherein at least one of the one or more interfaces are wireless interfaces.

12. The controller of claim 8, wherein the one or more interfaces comprise a electrical data port.

13. The controller of claim 8 further comprising a voltage limiter and a current limiter, wherein the voltage level is limited by the voltage limiter and the current level is limited by the current limiter.

14. A controller implemented method for controlling output at a power supply comprising:
   receiving programming from a user comprising a voltage output value and a current output value at a control unit;
   detecting a voltage feedback from a power converter with a voltage sensor and generating a voltage level based on the voltage feedback and the voltage output value;
   detecting a current feedback from the power converter with a current sensor and generating a current level based on the current feedback and the current output value;
   comparing the voltage level to a reference voltage with a voltage comparator and generating a voltage output signal based on this comparison;
   comparing the current level to a reference current with a current comparator, and generating a current output signal based on this comparison; and
   transmitting the voltage output signal and the current output signal to the power converter, wherein the voltage and current output of the power converter are respectively defined by the voltage output signal and the current output signal.

15. The method of claim 14 further comprising generating the reference voltage with a voltage reference.

16. The method of claim 14 further comprising generating the reference current with a current reference.

17. The method of claim 14 further comprising storing the programming in one or more memory devices.

18. The method of claim 14, wherein the programming is received wirelessly by the control unit.

19. The method of claim 14, wherein the current level is limited to a predefined maximum level by a current limiter.

20. The method of claim 14, wherein the voltage level is limited to a predefined maximum level by a voltage limiter.

\* \* \* \* \*